UNITED STATES PATENT OFFICE.

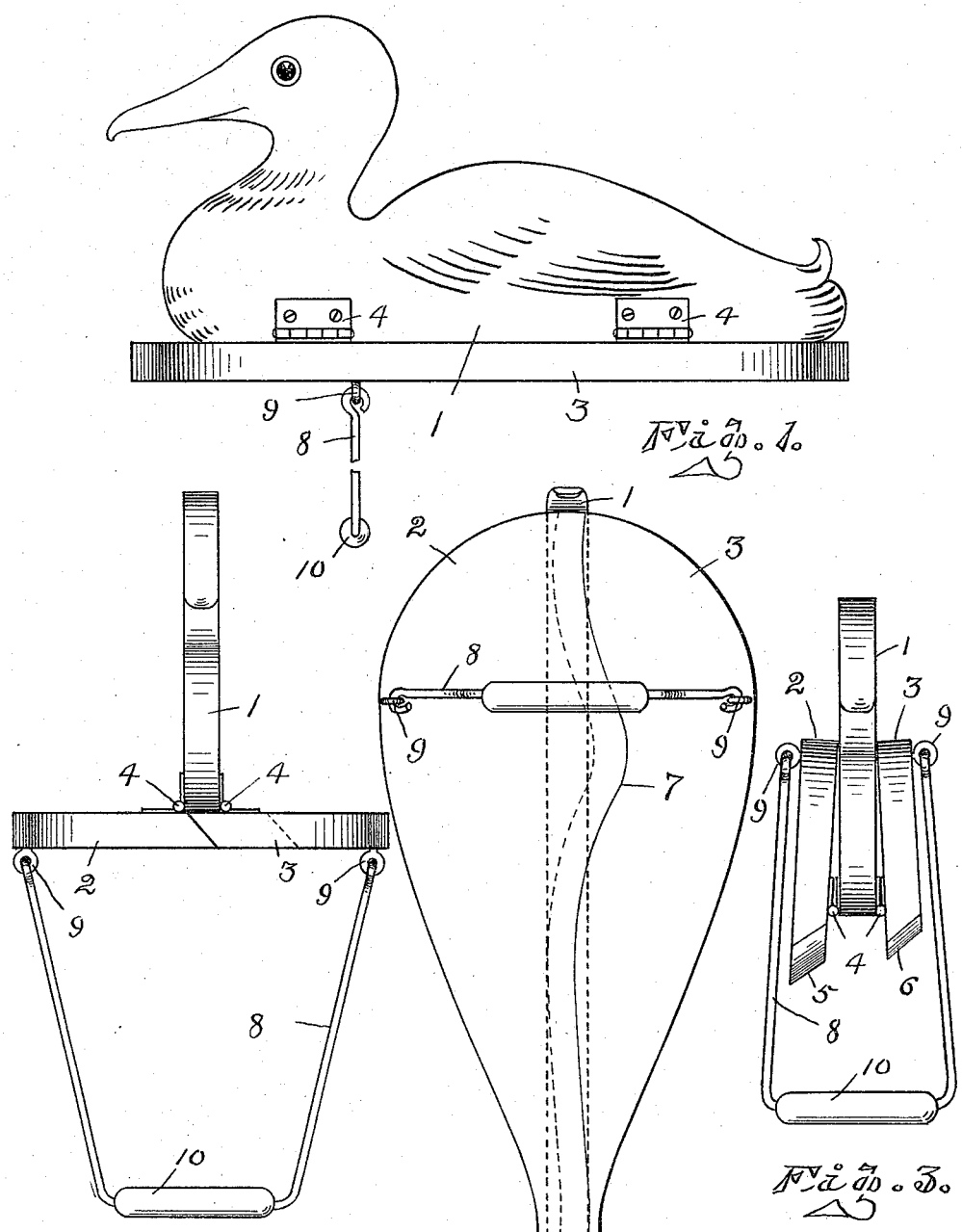

GEORGE W. JOHNSON, OF DULUTH, MINNESOTA.

DECOY.

1,183,567. Specification of Letters Patent. Patented May 16, 1916.

Application filed November 4, 1915. Serial No. 59,551.

*To all whom it may concern:*

Be it known that I, GEORGE W. JOHNSON, a citizen of the United States, residing at Duluth, in the county of St. Louis and State of Minnesota, have invented certain new and useful Improvements in Decoys, of which the following is a specification, reference being had therein to the accompanying drawing.

This invention consists of certain improvements in decoys and relates particularly to decoy ducks and the like, wherein the decoy is designed to float upon a body of water for alluring water fowl, such as ducks or geese.

The object is to produce a more practical and efficient device of this character than heretofore known.

Other objects and advantages will appear in the further disclosure of the invention.

In the accompanying drawings forming part of this application and in which like reference characters indicate like parts; Figure 1 is a side elevation of my improved decoy as it appears ready for use. Fig. 2 is a bottom plan view of Fig. 1. Fig. 3 is an end elevation of the decoy as it appears folded for storage or transportation, and Fig. 4 is an end elevation of Fig. 1.

1 represents the body portion of the decoy, representing a duck or other water fowl as desired, and which is mounted upon the two part base portion 2 and 3, the latter being pivotally hinged upon the opposite lower side edges of the body 1, as at 4—4—4—4, whereby the portions comprising the base may be folded upwardly against the sides of the body 1 when the decoy is not in use. The abutting edges 5 and 6 of the halves 2 and 3 are formed upon an incline thereto vertically, and longitudinally, in the form of an irregular curve, as illustrated at 7, Fig. 2. By this arrangement the half 2 overlaps the half 3 and both halves, at places, engage the full width of the lower edge of the body portion 1, and thus considerably strengthens the union between the halves of the base and between the base, and the body portion, when the decoy is in use.

A weighted spring bail 8 is pivotally attached to the outermost edges of the underside of the base 2—3 as at 9—9 and carries any form of suitable weight 10, the object of which is to keep the decoy right side up when floating upon the water. A further object of the bail, and the reason of its being made of spring wire is to provide means whereby the halves 2 and 3 of the base are maintained reasonably rigid both when in their opened and closed positions.

The bail being of a springy or resilient nature and the termini thereof, which are connected to the base of the decoy, made to normally tend toward each other, when the decoy is in its opened position the bail will exert a decided tendency to keep it so by the inward stress of the ends of the bail upon the outermost lower edges of the halves of the base and thus insure against the latter accidentally closing up against the sides of the body 1. However, when the halves of the base are forcibly closed to a position that the pivotal points of connection of the bail are above that of the connection of the halves of the base with the body portion of the decoy, then the same inward stress of the termini of the bail, will tend to keep the decoy folded, and intact for shipment which is a very desirable feature in the preservation of the decoy.

It is evident that various departures from the exact showing in the drawings herewith may be resorted to without departing from the spirit of my invention.

Having thus described my invention what I claim as new and desire to secure by Letters Patent is:—

1. A decoy of the character described, comprising a relatively vertically disposed body portion, a horizontally disposed base composed of two parts and pivotally hinged to the body portion, the abutting edges of the base being so formed that each part at places thereof engages the full width of the lowermost edge of the body portion.

2. A foldable decoy of the character described, comprising a vertically disposed body and a horizontally disposed base composed of two parts pivotally hinged to the body and foldable there against, one of the parts overlapping the other and both parts at places engaging the lower edge of the body the full width thereof.

3. A foldable decoy of the character described, comprising a vertically disposed body and a horizontally disposed base, the latter being composed of two parts pivotally hinged to the body, each of the parts at places engaging the lowermost edge of the body the full width thereof, for the purpose described.

4. A foldable decoy of the character described, comprising a vertically disposed body, a horizontally disposed base composed of two parts pivotally hinged to the body and foldable there against, one of the parts overlapping the other and both parts at places overlapping the lowermost edge of the body the entire width thereof and resilient means for holding the base parts either in their vertical position or their horizontal position for the purposes described.

5. In a foldable decoy of the character described, the combination with a two part base portion of a depending pivotally attached resilient weight supporting bail, so adjusted that the resiliency of the bail will either hold the base parts in their horizontal open position or in their vertical folded position as the case requires.

6. In a foldable decoy of the character described, the combination with a two part pivotal base portion of a resilient weight supporting bail attached to the base and so adjusted that the resiliency of the bail automatically holds the base parts together when either opened or folded.

7. In a foldable decoy of the character described, the combination with a two part pivotal base portion of a resilient member attached to the base and so adjusted that the resiliency thereof automatically holds the base parts together when either opened or folded.

In testimony whereof I hereunto affix my signature in the presence of two witnesses.

GEORGE W. JOHNSON.

Witnesses:
W. W. DENHAM,
S. GEO. STEVENS.

Copies of this patent may be obtained for five cents each, by addressing the "Commissioner of Patents, Washington, D. C."